United States Patent [19]
Lukowski, Sr.

[11] Patent Number: 5,972,148
[45] Date of Patent: Oct. 26, 1999

[54] PROCESS FOR APPLYING A RELEASIBLE PROTECTIVE LAYER TO AN ADHESIVE SURFACE OF A FLEXIBLE SHEET FLOORING PRODUCT

[75] Inventor: Robert W. Lukowski, Sr., Lancaster, Pa.

[73] Assignee: Skitech Partners, Salunga, Pa.

[21] Appl. No.: 09/119,083

[22] Filed: Jul. 20, 1998

[51] Int. Cl.$^6$ .......................... B65H 81/02; B65H 81/04; B32B 9/04
[52] U.S. Cl. .......................... 156/184; 156/289; 156/191; 428/40.1; 428/42.1
[58] Field of Search .................... 156/289, 184; 264/210.2, 210.5

[56] References Cited

U.S. PATENT DOCUMENTS

| | | | |
|---|---|---|---|
| 2,328,057 | 8/1943 | Coulter | 117/76 |
| 2,430,934 | 11/1947 | Kemmler et al. | 154/49 |
| 2,696,447 | 12/1954 | Bezman . | |
| 2,705,683 | 4/1955 | Hazeltine, Jr. et al. . | |
| 2,739,082 | 3/1956 | Bezman et al. . | |
| 3,135,647 | 6/1964 | Wheeley . | |
| 3,442,730 | 5/1969 | Albert Dietz . | |
| 3,625,807 | 12/1971 | Beemer . | |
| 3,990,929 | 11/1976 | Evans | 156/71 |
| 4,114,346 | 9/1978 | Kelly . | |
| 4,135,675 | 1/1979 | Greiner, Jr. et al. | 242/67.1 |
| 4,141,735 | 2/1979 | Schrader et al. | 96/75 |
| 4,274,916 | 6/1981 | Grose | 162/145 |
| 4,276,107 | 6/1981 | Pufahl | 156/238 |
| 4,307,145 | 12/1981 | Goldman . | |
| 4,988,551 | 1/1991 | Zegler | 428/40 |
| 4,990,399 | 2/1991 | Hoopengardner . | |
| 5,188,874 | 2/1993 | Kauffman et al. | 428/47 |
| 5,217,552 | 6/1993 | Miyajima et al. . | |
| 5,242,726 | 9/1993 | Pariseau et al. . | |
| 5,405,681 | 4/1995 | Nakayama et al. | 428/215 |
| 5,676,787 | 10/1997 | Rusincovitch et al. | 156/277 |

*Primary Examiner*—Richard Crispino
*Assistant Examiner*—Sue A. Purvis
*Attorney, Agent, or Firm*—Adams Law Firm, P.A.

[57] ABSTRACT

A process for applying a removable and releasible protective layer over an adhesive surface of a flexible sheet flooring product while simultaneously collecting the flooring product on a core roll. The process includes the steps of attaching a leading end of the protective layer to the core roll, and attaching a leading end of the flooring product to the core roll. The flooring product is oriented such that the adhesive surface faces inwardly towards the core roll and adjacent the protective layer. The core roll is then rotated such that the protective layer is applied to and overlies the adhesive surface of the flooring product as the flooring product is simultaneously collected on the core roll.

7 Claims, 2 Drawing Sheets

PROCESS FOR APPLYING A RELEASIBLE PROTECTIVE LAYER TO AN ADHESIVE SURFACE OF A FLEXIBLE SHEET FLOORING PRODUCT

TECHNICAL FIELD AND BACKGROUND OF THE INVENTION

This invention relates to a process for applying a releasible protective layer to an adhesive surface of a flexible sheet flooring product. The protective layer covers and protects the adhesive surface of the flooring product prior to installation, and facilitates handling of the flooring product during transport and installation. The invention allows the flooring product to be conveniently rolled up or folded without wrinkling or creasing the protective layer. Wrinkles and creases in the protective layer generally transfer to the wear layer causing aesthetic deformations and damage to the flooring product.

A laminated sheet vinyl flooring product, such as described in Applicant's co-pending U.S. patent application Ser. No. 08/853,677 filed on May 9, 1997, is shown in FIG. 1. The complete disclosure of this application is incorporated herein by reference. The flooring product shown includes a resilient vinyl wear layer, a felt fiber layer overlying the wear layer, a pressure-sensitive adhesive coating applied to the fiber layer, and a plastic release liner covering the adhesive coating.

After manufacture, the flooring product is typically rolled up to facilitate storage, transport, and installation. In order to roll up the flooring product without damaging its wear layer, the product must be sufficiently thin and flexible to accommodate slight changes in its linear dimension between the top surface and the bottom surface. This problem is explained further with reference to FIG. 2. As shown, a standard laminated felt-backed flooring product is typically rolled up with the wear layer facing out. Due to the thickness of the flooring product and because the wear layer does not generally stretch, the felt backing becomes compressed when rolled.

In the laminated flooring product shown in FIG. 1, rolling in this manner will likewise cause the felt layer and release liner to compress. Thus, if the release liner is first mated with the adhesive-coated felt backing when the flooring product is laid flat and the flooring product is subsequently rolled up, the release liner will compress and wrinkle. These wrinkles create permanent deformations in the wear layer, and generally result in a flooring product which is unacceptable to the end user.

The present invention addresses this problem by applying the release liner to the flooring product after the flooring product is already curved in a roll. When the flooring product is later unrolled, it lies flat without any wrinkles in the release liner and without damage to the wear layer. Moreover, application of the invention is not limited to the laminated sheet flooring product shown in FIG. 1.

SUMMARY OF THE INVENTION

Therefore, it is an object of the invention to apply a release liner to a sheet flooring product in a manner that will not cause wrinkling of the release liner when the flooring product is rolled up or folded.

It is another object of the invention to apply a release liner to a sheet flooring product in a manner which will not cause permanent deformations in the wear layer of the flooring product when the flooring product is rolled up or folded and stored prior to installation.

It is another object of the invention to provide a process which applies a release liner to an adhesive surface of the flooring product while simultaneously collecting the flooring product on a roll.

It is another object of the invention to provide a laminated sheet flooring product with a releasible and removable protective liner.

It is another object of the invention to provide a laminated sheet flooring product with a protective liner that is releasible and removable.

These and other objects of the present invention are achieved in the preferred embodiments disclosed below by providing a process for applying a removable and releasible protective layer over an adhesive surface of a flexible sheet flooring product while simultaneously collecting the flooring product on a core roll. The process includes the steps of attaching a leading end of the protective layer to the core roll, and attaching a leading end of the flooring product to the core roll. The protective layer is wound on the core roll prior to its contact with the adhesive surface of the flooring product. The flooring product is oriented such that the adhesive surface faces inwardly towards the core roll and adjacent the protective layer. The core roll is then rotated such that the protective layer is applied to and overlies the adhesive surface of the flooring product as the flooring product is simultaneously collected on the core roll.

According to one preferred embodiment of the invention, the process includes the step of heating the protective layer prior to its application to the adhesive surface of the flooring product on the core roll.

According to another preferred embodiment of the invention, the process includes the step of tensioning the protective layer prior to its application to the adhesive surface of the flooring product on the core roll.

According to yet another preferred embodiment of the invention, the protective layer is polyethylene.

According to yet another preferred embodiment of the invention, the thickness of the polyethylene layer is less than 2 mils.

The process for making a flexible sheet flooring product according to the invention includes the steps of coating a surface of the flooring product with a pressure-sensitive adhesive. A removable and releasible protective layer is then applied over the adhesive surface of the flooring product while simultaneously collecting the flooring product on a core roll. This is achieved by attaching a leading end of the protective layer to the core roll, and attaching a leading end of the flooring product to the core roll. The flooring product is oriented such that the adhesive surface faces inwardly towards the core roll and adjacent the protective layer. The core roll is then rotated such that the protective layer is applied to and overlies the adhesive surface of the flooring product as the flooring product is simultaneously collected on the core roll.

According to one preferred embodiment of the invention, the step of applying the adhesive to the flooring product includes using an adhesive roll coater to coat the flooring product with adhesive.

According to another preferred embodiment of the invention, the process includes the step of drying the adhesive after its application to the flooring product and prior to application of the protective layer.

According to yet another preferred embodiment of the invention, the step of drying the adhesive includes exposing the adhesive surface of the flooring product to the atmosphere after application of the adhesive and prior to application of the protective layer.

According to yet another preferred embodiment of the invention, the step of drying the adhesive further includes locating a forced-air drier adjacent the adhesive surface of the flooring product after application of the adhesive and prior to application of the protective layer.

In another embodiment, a process for making a flexible laminated sheet flooring product having a resilient wear layer and a fiber backing includes the step of first coating the fiber backing of the flooring product with adhesive. A removable and releasible protective layer is then applied over the fiber backing to cover the adhesive coating prior to installation of the flooring product, and simultaneously collecting the flooring product on a core roll. This is achieved by attaching a leading end of the protective layer to the core roll, and attaching a leading end of the flooring product to the core roll. The flooring product is oriented such that the adhesive surface faces inwardly towards the core roll and adjacent the protective layer. The core roll is then rotated such that the protective layer is applied to and overlies the adhesive surface of the flooring product as the flooring product is simultaneously collected on the core roll.

In yet another embodiment, a process for making a flexible laminated sheet flooring product having a resilient vinyl wear layer and a felt fiber backing includes the step of first coating the felt backing of the flooring product with an adhesive. A removable and releasible protective layer is then applied over the felt backing to cover the adhesive coating prior to installation of the flooring product while simultaneously collecting the flooring product on a core roll. This is achieved by attaching a leading end of the protective layer to the core roll, and attaching a leading end of the flooring product to the core roll. The flooring product is oriented such that the adhesive surface faces inwardly towards the core roll and adjacent the protective layer. The core roll is then rotated such that the protective layer is applied to and overlies the adhesive surface of the flooring product as the flooring product is simultaneously collected on the core roll.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
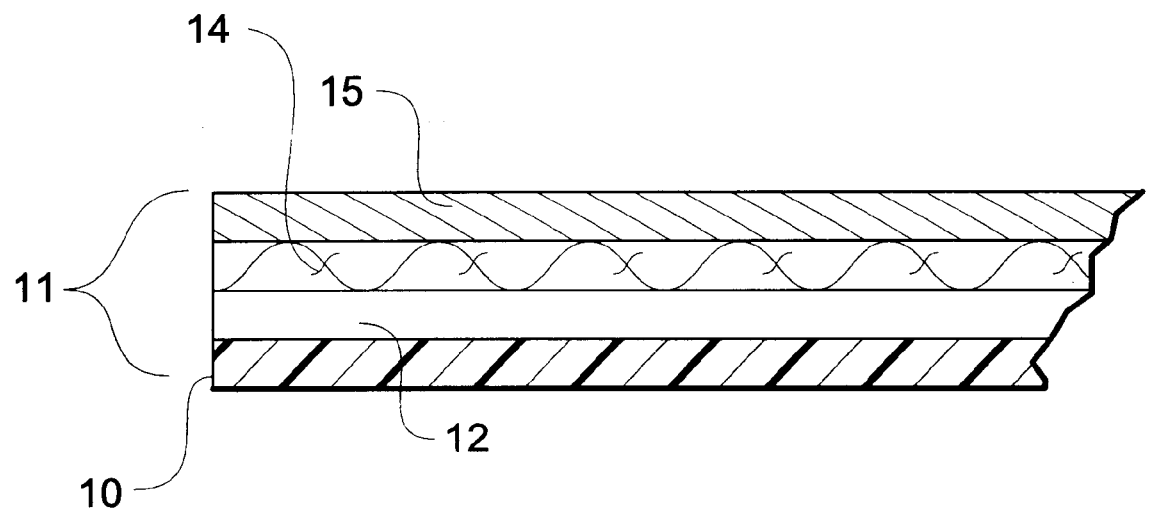
FIG. 1 is a fragmentary, cross-sectional view of a laminated sheet flooring product according to one embodiment of Applicant's invention described in its pending U.S. patent application, Ser. No. 08/853,677 filed on May 9, 1997.
Figure 2:
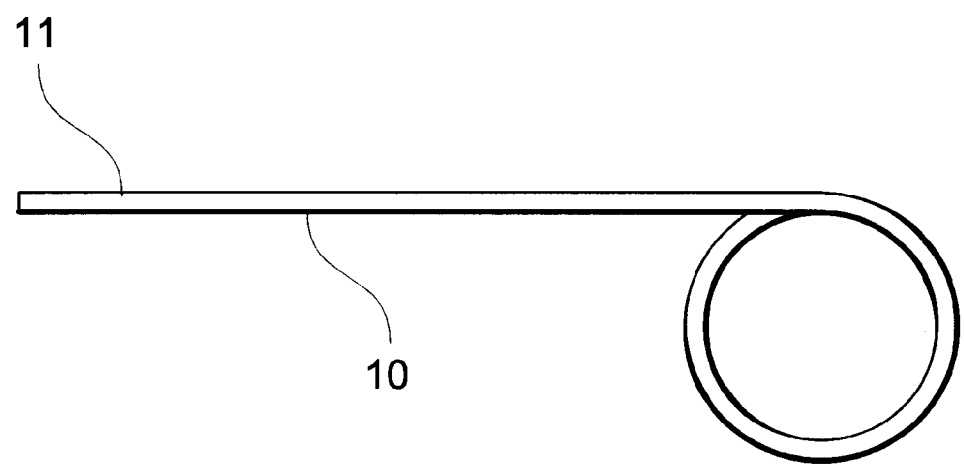
FIG. 2 is a schematic view showing a conventional, prior art sheet flooring product being rolled up.
Figure 3:
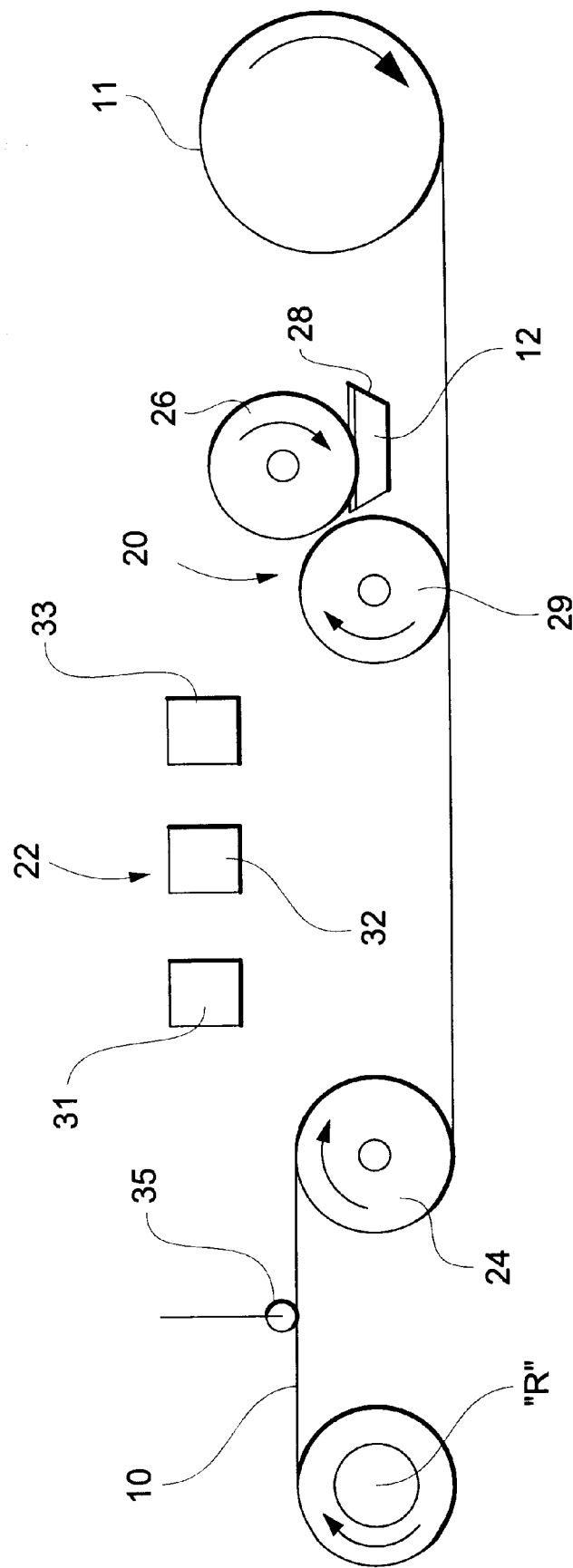
FIG. 3 is a schematic view showing a method according to one embodiment of the present invention of applying a release liner to a laminated sheet flooring product.

Referring now specifically to the drawings, the steps for applying a thermoplastic release liner 10 to a laminated sheet vinyl flooring product 11 (See FIG. 1) during manufacture are illustrated in FIG. 3. The release liner 10 is applicable for temporarily covering the adhesive 12 applied to the felt layer 14 of the flooring product 11, and is readily peeled away from the flooring product 11 to expose the adhesive 12 immediately prior to installation. When dried, the adhesive 12 has sufficient tack to secure the flooring product 11 to the subfloor, while permitting removal and repositioning of the flooring product 11 without damaging the bond between the vinyl wear layer 15 and felt layer 14. The release liner 10 is preferably formed of a stretchable, low density or high density polyethylene having a thickness of about 2 mils or less, and preferably about 0.5 mils.

The laminated flooring product 11 including the felt layer 14 and vinyl wear layer 15 is stored in roll form with the wear layer 15 facing outward and the felt layer 14 facing inward. The lead end of the flooring product 11 is passed under an adhesive roller assembly 20, through a drying station 22, and downstream to a mechanically-driven core roller 24. The adhesive roller assembly 20 includes a pick-up roller 26 which collects wet adhesive 12 from a supply trough 28, and transfers the adhesive 12 to a counter-rotating application roller 29. The application roller 29 applies wet adhesive 12 to the felt layer 14 of the flooring product 11. The adhesive 12 is preferably applied at a rate of about one quart per 20 square yards of flooring. According to one embodiment, the adhesive 12 is a water based, acrylic adhesive such as described in Applicant's pending application, Ser. No. 08/853,677 filed on May 9, 1997.

After application of the wet adhesive 12, the flooring product 11 passes downstream through the drying station 22 where the adhesive 12 dries to a pressure-sensitive tacking condition. The resulting adhesive tack is sufficient to releasibly adhere the flooring product 11 to an adjacent surface, and allows removal of the flooring product 11 from the adjacent surface without damaging the bond between the felt layer 14 and the wear layer 15.

The drying station 22 preferably includes a series of overhead dryer fans 31, 32, and 33 directed downwardly towards the flooring product 11. The dryer fans 31, 32, and 33 effect quick evaporation of volatiles in the adhesive 12, and allow increased line speed and production by reducing the drying time of the adhesive 12. Alternatively, the adhesive 12 may be air dried at slower line speeds without any fans.

The release liner 10 is stored on a packaging roll "R" rotatably mounted on a downstream side of the core roller 24 opposite the flooring product 11, and is fed upstream under a conventional spreader bar 35 and tensioned sufficiently to pull out any wrinkles. The lead end of the release liner 10 passes over the top of the core roller 24, and is attached at a point adjacent the lead end of the flooring product 11 at the bottom of the core roller 24. Thus, the release liner 10 is wound smoothly on the core roll 24 prior to its contact with the adhesive-coated felt layer 14 of the flooring product 11. Rotation of the core roller 24 mates the release liner 10 and the flooring product 11 together such that the liner 10 completely overlies the felt layer 14, while simultaneously collecting the flooring product 11 on the core roller 24. The width of the release liner 10 is preferably equal to the width of the flooring product 11.

To accommodate an effective reduction in linear dimension of the inside surface of the flooring product 11 when rolled and compressed, the rate at which the release liner 10 is fed to the core roller 24 is less than the feed rate of the flooring product 11 to the core roller 24. This creates tension in the release liner 10 in the appropriate dimension upon mating with the flooring product 11 on the core roller 24. The dry tacky adhesive 12 holds the release liner 10 in this tensioned condition upon mating with the flooring product 11. The release liner 10 is smoothly attached to the core roll 24 prior to contact with the adhesive coated flooring product 11 as the flooring product 11 is collected on the core roll 24. This allows smooth roll-up of the release liner 10 and flooring product 11 without any wrinkles or creases. When the flooring product 11 is unrolled for installation, the release liner 10 elongates to a stretched condition to accommodate the slightly increased linear dimension of the inside surface of the flooring product 11 when laid flat. The ability to elongate and its inherent non-binding properties make polyethylene an especially well suited release liner—although a release liner formed of other materials may be equally applicable.

To further tension the release liner 10 prior to its mating with the flooring product 11, a friction brake (not shown) or other suitable device may be applied to the packaging roll "R" to slow delivery of the release liner 10 to the core roller 24. In addition, to further increase its conformability, the release liner 10 may be heated as it moves from the packaging roll "R" to the core roller 24.

A process for applying a release liner to a sheet flooring product including a pressure sensitive adhesive coating is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A process for making a flexible, laminated, multiple layer sheet flooring product having a resilient vinyl wear layer and a fiber backing, comprising the steps of:

(a) laminating the vinyl wear layer and fiber backing together;

(b) coating the fiber backing of the flooring product with adhesive;

(c) applying a removable and releasible thermoplastic protective layer over the fiber backing to cover the adhesive coating prior to installation of the flooring product, and simultaneously collecting the flooring product and protective layer on a core roll, comprising the steps of:

(i) attaching a leading end of the protective layer to the core roll;

(ii) attaching a leading end of the flooring product to the core roll, the flooring product being oriented such that the adhesive coating faces inwardly towards the core roll and adjacent the protective layer; and (iii) rotating the core roll such that the protective layer is releasibly affixed to and overlies the adhesive coating of the flooring product as the flooring product and protective layer are simultaneously collected on the core roll, the protective layer being applied to the flooring product at the core roll in a tensioned condition, such that:

upon compression of an inside layer of the flooring product when rolled, the protective layer conforms co the flooring product without substantial wrinkling or creasing; and upon linear expansion of the inside layer of the flooring product when unrolled for installation, the protective layer stretches and elongates as the flooring product is laid flat.

2. A process according to claim 1, wherein the protective layer comprises polyethylene.

3. A process according to claim 2, wherein the thickness of the polyethylene layer is less than 2 mils.

4. A process for making a flexible, laminated, multiple layer sheet flooring product having a resilient vinyl wear layer and a felt fiber backing, comprising the steps of:

(a) laminating the vinyl wear layer and felt fiber backing together;

(b) coating the felt backing of the flooring product with an adhesive;

(c) applying a removable and releasible thermoplastic protective layer over the felt backing to cover the adhesive coating prior to installation of the flooring product while simultaneously collecting the flooring product and protective layer on a core roll, comprising the steps of:

(i) attaching a leading end of the protective layer to the core roll;

(ii) attaching a leading end of the flooring product to the core roll, the flooring product being oriented such that the adhesive coating faces inwardly towards the core roll and adjacent the protective layer; and (iii) rotating the core roll such that the protective layer is releasibly affixed to and overlies the adhesive coating of the flooring product as the flooring product and protective layer are simultaneously collected on the core roll, the protective layer being applied to the flooring product at the core roll in a tensioned condition, such that;

upon compression of an inside layer of the flooring product when rolled, the protective layer conforms to the flooring product without substantial wrinkling or creasing; and upon linear expansion of the inside layer of the flooring product when unrolled for installation, the protective layer stretches and elongates as the flooring product is laid flat.

5. A process according to claim 4, wherein the protective layer comprises polyethylene.

6. A process according to claim 5, wherein the thickness of the polyethylene layer is less than 2 mils.

7. The flooring product according to claims 1 or 4.

* * * * *